US012149663B1

(12) United States Patent
Kanagasabai et al.

(10) Patent No.: US 12,149,663 B1
(45) Date of Patent: Nov. 19, 2024

(54) METHODS AND SYSTEMS FOR DETECTING ONE OR MORE SECURITY PATTERNS IN DOCUMENTS

(71) Applicant: XEROX CORPORATION, Norwalk, CT (US)

(72) Inventors: Rajasekar Kanagasabai, Chennai (IN); Sainarayanan Gopalakrishnan, Chennai (IN); Vignesh Doss, Palanichettipatti (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/530,535

(22) Filed: Dec. 6, 2023

(51) Int. Cl.
| | |
|---|---|
| G06V 10/75 | (2022.01) |
| G06F 21/60 | (2013.01) |
| G06T 3/40 | (2024.01) |
| G06V 10/22 | (2022.01) |
| G06V 10/62 | (2022.01) |
| G06V 30/148 | (2022.01) |
| G06V 30/18 | (2022.01) |
| G06V 30/19 | (2022.01) |
| G06V 30/414 | (2022.01) |
| H04N 1/00 | (2006.01) |

(52) U.S. Cl.
CPC ....... *H04N 1/00846* (2013.01); *G06F 21/604* (2013.01); *G06V 30/148* (2022.01); *G06V 30/18019* (2022.01); *G06V 30/18105* (2022.01); *G06V 30/19013* (2022.01); *G06V 30/414* (2022.01); *H04N 1/00875* (2013.01)

(58) Field of Classification Search
None
See application file for complete search history.

(56) References Cited

U.S. PATENT DOCUMENTS

| | | | |
|---|---|---|---|
| 2022/0051043 A1* | 2/2022 | Lee | G06N 3/08 |
| 2023/0237767 A1* | 7/2023 | Su | G06V 30/18143 |
| | | | 382/195 |

* cited by examiner

*Primary Examiner* — Andrew H Lam

(57) ABSTRACT

The present disclosure discloses methods and systems for detecting one or more security patterns in a document submitted at a multi-function device. According to the disclosure the document is received at the multi-function device, wherein the document includes at least textual content. Thereafter, a pre-defined operation is performed to detect edges of the at least textual content. Once detected, one or more text edges are filtered based on one or more templates. Further, based on the one or more templates, shape and color of the filtered one or more text edges are analyzed, and accordingly, the presence of the one or more security patterns is ascertained in the submitted document at the multi-function device.

23 Claims, 8 Drawing Sheets

METHODS AND SYSTEMS FOR DETECTING ONE OR MORE SECURITY PATTERNS IN DOCUMENTS

CROSS-REFERENCE TO RELATED APPLICATIONS

Cross-referenced is commonly assigned, entitled "METHODS AND SYSTEMS FOR ADDING ONE OR MORE SECURITY PATTERNS IN DOCUMENTS", (U.S. Provisional patent application Ser. No. 18/530,511).

TECHNICAL FIELD

The present disclosure relates to the field of document security. More specifically, the disclosure relates to methods and systems for detecting one or more security patterns in documents.

BACKGROUND

Organizations and individuals deal with different confidential documents such as legal documents, bank bonds, research data, contract documents, prescriptions, coupons, tickets, invoices, and the like. Various techniques are deployed to prevent these confidential documents from any malicious activity, e.g., counterfeiting, forging, etc. One such technique involves the addition of special security marks such as watermarks, barcodes, QR codes, or the like, in the documents.

However, in most of such techniques, the security mark and/or its location is visible to users, i.e., the location/position of the security marks are visible to the users, if not completely at least partially. Due to this, the chances of duplication of the security mark increase and thus make the confidential document exposed to malicious activities. Moreover, in most of such techniques complex processing is involved and few even require special scanners to detect the security marks and verify the genuineness/authenticity of the confidential documents. Sometimes, organizations use special patterns to secure the documents, however, the process remains non-user friendly.

In this light, there is a need for improved systems and methods that are user-friendly, allow easy detection while copying or scanning documents, and add a strong layer of security to the documents.

SUMMARY

According to aspects illustrated herein, a method for detecting one or more security patterns in a document submitted at a multi-function device is disclosed. The method includes receiving the document at the multi-function device, wherein the document includes at least textual content. Thereafter, a pre-defined operation is performed to detect edges of the at least textual content. Once detected, one or more text edges are filtered based on one or more templates. Further, based on the one or more templates, shape and color of the filtered one or more text edges are analyzed, and accordingly, the presence of the one or more security patterns is ascertained in the submitted document at the multi-function device.

According to further aspects illustrated herein, a multi-function device for detecting one or more security patterns in a document submitted at a multi-function device is disclosed. The multi-function device includes a receiver for receiving the document at the multi-function device, wherein the document includes at least textual content. The multi-function device also includes an edge detection module for detecting edges of the at least textual content. Further, the multi-function device includes a security pattern detection module for: upon detection, filtering, one or more text edges based on one or more templates; further analyzing, based on the one or more templates, shape and color of the filtered one or more text edges; and based on the analysis, ascertaining whether the one or more security patterns are present in the submitted document at the multi-function device.

According to additional aspects illustrated herein, a method for detecting one or more security patterns in a document submitted at a multi-function device is disclosed. The method includes receiving the document including at least one textual content. The document is segmented into one or more layers including image layers and text layers. Thereafter, one or more edge detection methods are performed on the segmented document, to detect edges of the at least textual content. Once detected, a portion of the document having the at least textual content is identified, where the one or more security patterns are expected to be present based on the one or more templates. Thereafter, one or more text edges matching edge filtering criteria are identified. Further, shape and color of the identified one or more text edges are analyzed, and based on the analysis of the shape and color of the identified text edges, presence of the one or more security patterns in the submitted document at the multi-function device is ascertained.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
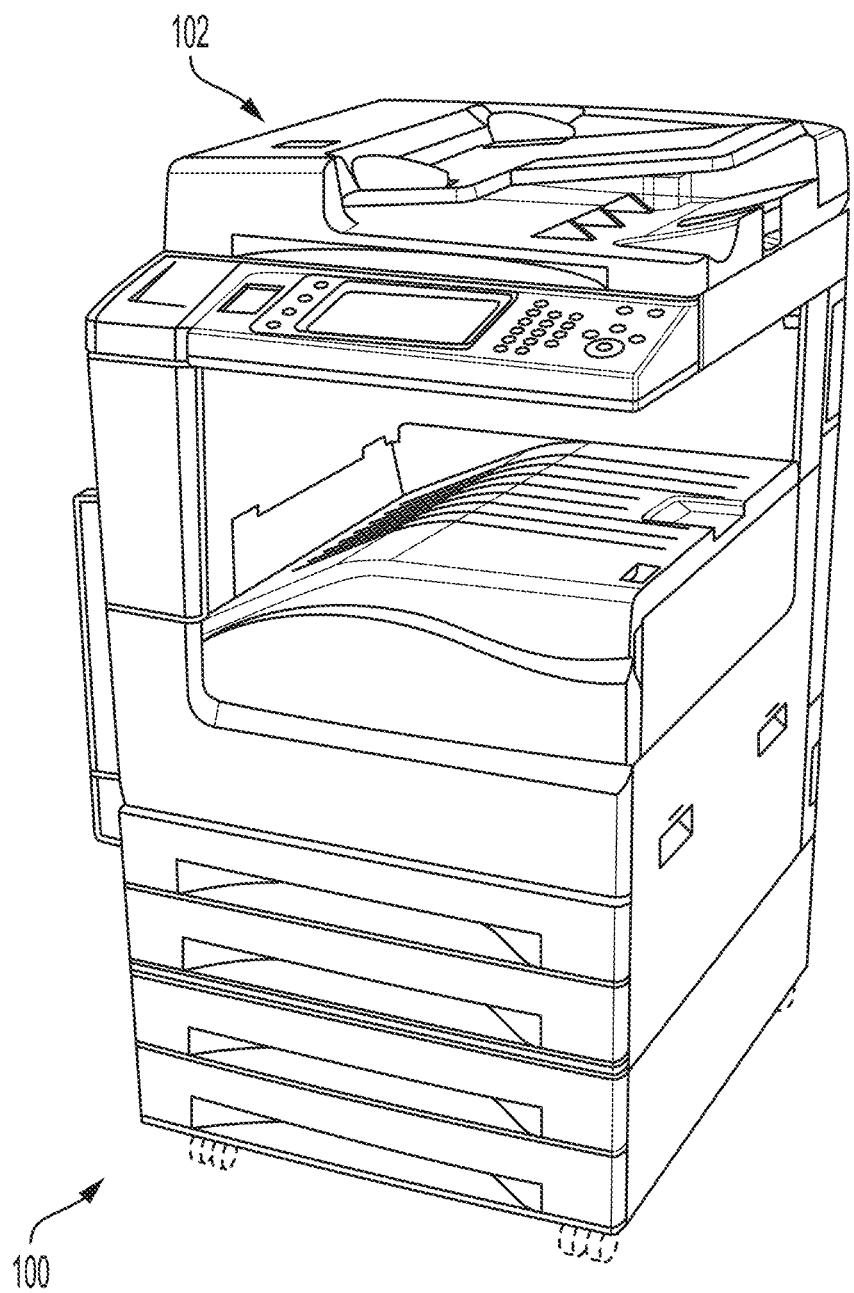
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, scanning, copying, imaging, or the like. The multi-function device may include software, hardware, firmware, or a combination thereof. In the context of the current disclosure, the multi-function device detects security patterns around text edges in documents such as confidential documents. Specifically, the multi-function device detects color dot patterns around the edges of one or more texts of the documents. The presence of the security patterns in the document establishes authenticity/genuineness/originality/confidentiality of the document. The multi-function device performs detection on scanned data. The scanned data refers to raw scanned images generated upon scanning, where no image processing techniques are implemented. The scanned data refers to intermediate scanned images. Various image processing techniques, for example, image segmentation, edge detection, etc., are performed on the scanned data. The scanned data can be termed as a scanned image. Further, the multi-function device extracts a specified portion from the scanned data, performs edge detection and filtering on the extracted scanned data, and analyzes pattern information including shape and color of the filtered scanned data.

The term "document" refers to any document having confidential information or otherwise confidential for individual users, organizations, nations, or the like. Various examples of such documents may be, but not limited to, cheques, legal documents, bank bonds, research data, contract documents, prescriptions, coupons, tickets, invoices, disclosure documents, or the like. The document may include content in the form of text, images, graphics, or a combination thereof. In the context of the disclosure, the document includes security patterns, specifically color dot patterns around one or more edges of texts of the document. The document can be submitted for scanning or copying. In such cases, the document submitted is in the physical form. The document including the one or more security patterns is referred to as a stamped document.

The term "template" refers to include information used for detecting the security patterns, specifically detecting the color dot pattern around the edges of texts (text edges) of the document. The template includes portion information, edge filtering criteria and pattern information. The term "portion information" refers to information related to a particular portion of a document where security patterns can be present or expected to be present. The information can be in the form of coordinates of a particular portion of the document. The term "edge filtering criteria" refers to various factors based on which one or more probable edges of the texts/characters are identified that may include the security patterns. Few examples of the edge filtering criteria include edge angle, edge size, edge intense value, or the like. The edge filtering criteria "edge angle" indicates the angle of an edge. In one example, the edge angle indicates an angle of the edge of a text/character (alphabet) that the edge makes with the horizontal. The edge filtering criteria "edge size" indicates the size of an edge. In one example, the edge size can be the area/dimension (length*width) of an edge. The edge size is measured in terms of number of pixels. The edge filtering criteria "edge intense" indicates the width/thickness of the text edge, i.e., minimum intense of the text edge that may include the security pattern and it is also measured in terms of number of pixels. The term "pattern information" refers to information related to color of the security pattern/dots and shape/pattern of the security dots. Further, the information included in the template, i.e., values/information corresponding to the portion information, different factors of edge filtering criteria, and pattern information can be input by the user or can be pre-stored on the multi-function device. Moreover, the templates can be defined by the user and/or by an organization and/or an admin user.

The term "pattern" refers to a pattern/shape formed by two or more color dots on the text edges. The pattern can be a line or a pattern/shape that fits the edge constraints, i.e., edge angle, edge size, edge intense, and the like.

The term "security patterns" refers to one or more color dot patterns that are added/embedded around edges of one or more characters of the textual content in a document to ensure its authenticity/genuineness/originality/confidentiality. The security patterns are added based on primary colors, i.e., Cyan (C), Magenta (M), Yellow (Y), Black (K), of the CMYK format.

The term "pre-defined operation" refers to include any known or later developed edge detection techniques applied on the submitted document to detect edges of the different types of content in the submitted document.

The term "stamped document" refers to a document having the one or more security patterns in the document.

The term "text edge" represents an edge of a character (i.e., alphabets) of the textual content. Each text, specifically each character has one or more text edges and the text edges can be filtered based on edge angle (i.e., the angle that the text edge makes with the horizontal), edge size (i.e., size/area/dimensions of the text edge) and the edge intense value (i.e., intense or width/thickness of the text edge that may include the security pattern).

The term "user" refers to include any user who submits the document at the multi-function device and/or an admin user. This user knows/understands text edge angles, edge size, edge intense value or other information relevant for implementing the present disclosure. In some implementations, this user obtains information through other ways such as other users.

For easy understanding, all detection operations are performed on text edges of text content, where text content/text represents a character in the text content.

Overview

The present disclosure discloses methods and systems for detecting security patterns around edges of one or more texts of a document. Specifically, the methods and systems detect the color dot patterns around one or more text edges present in the document. Upon detecting the security patterns in the document, the methods and systems establish authenticity/genuineness/originality/confidentiality of the document. For example, if the security pattern is present in the document, then the document can be considered an original document. In another example, if the security pattern is present in the document, then the document can be considered a confidential document. If the security pattern is present in the document, then the document can be considered an authentic document. If the security pattern is present in the document, then the document can be considered a genuine document. Based on the detection of the security patterns in the document, the user is allowed or disallowed to process the job, e.g., reproduce a duplicate version of the submitted document.

Exemplary Environment

FIG. 1 shows an exemplary environment 100 in which various embodiments of the disclosure can be practiced. The environment 100 includes a multi-function device 102 that provides one or more functionalities such as printing, scanning, imaging, copying, and so on. The multi-function device 102 as shown is just one example but the environment 100 may include scanners, printers, or any devices with scanning/printing functionalities. In the context of the current disclosure, the multi-function device 102 detects security patterns around edges of texts of a document. Specifically, the multi-function device 102 detects the security patterns that include color dot patterns around the edges of one or more texts of the document.

The documents can be any document belonging to the user, confidential or otherwise. The document includes content such as texts, images, graphics, or a combination thereof. Few examples of the confidential documents include cheques, legal documents, bank bonds, research data, contract documents, prescriptions, coupons, tickets, invoices, disclosure documents, and the like. In the context of the disclosure, the document includes a security pattern in the form of color dot patterns around text edges in the document.

In implementation, a user submits a document at the multi-function device 102, for scanning or copying. The submitted document is in a physical form such as printed on paper. For easy understanding, the disclosure is explained with respect to a scenario where the user submits the document for scanning or copying. Before reproducing a duplicate version of the document, the multi-function device 102 detects the presence of security patterns in the document, and this will be discussed below in detail.

Once the document is received, the multi-function device 102 segments the document into a text portion and an image portion, where the image portion includes non-textual content such as images, background, etc., and the text portion includes textual contents of the document. Once segmented, the multi-function device 102 extracts the text portion and performs edge detection. Thereafter, based on template information, the multi-function device 102 identifies one or more text edges that may include the security patterns and detects the security pattern on the identified text edges. Here, the template information can be pre-stored in the multi-function device 102 or can be obtained from the user. Once obtained, the multi-function device 102 identifies the text edges based on portion/location information and various edge filtering criteria/factors such as edge angle, edge size and edge intense value included in the template information. Thereafter, the multi-function device 102 obtains pattern information related to the detected/identified text edges and matches with the pattern information included in the template. Upon matching, the multi-function device 102 ascertains whether the document includes the security pattern or not. As a result, the multi-function device 102 further detects whether the document is genuine/original/authentic/confidential. Based on this, the multi-function device 102 classifies the document and takes a desired action. In one example, based on the detection of the security pattern, the multi-function device 102 allows or disallows the user to reproduce a copy of the submitted document, for instance, if the security pattern is detected, the multi-function device 102 disallows the user to reproduce a copy of the submitted document. In another example, based on the detection of the security pattern, the multi-function device 102 notifies the admin user or an owner of the document.

Exemplary System

Figure 2:
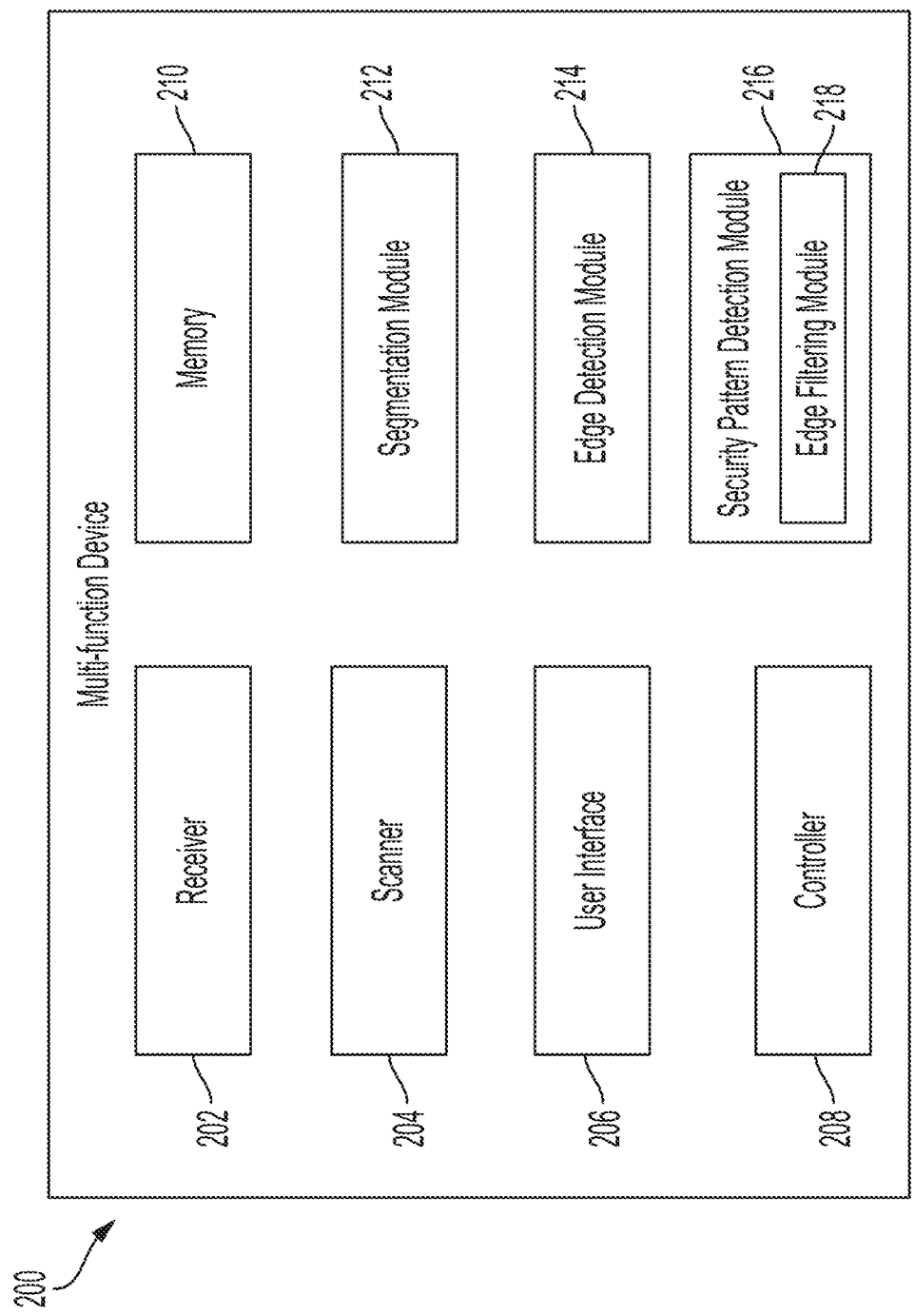
FIG. 2 is a block diagram illustrating various components of a multi-function device, in accordance with an embodiment of the present disclosure.

FIG. 2 is a block diagram illustrating various components of a multi-function device 200 for implementing the current disclosure. As shown, the multi-function device 200 includes a receiver 202, a scanner 204, a user interface 206, a controller 208, a memory 210, a segmentation module 212, an edge detection module 214, and a security pattern detection module 216, which further includes an edge filtering module 218. Although the segmentation module 212, the edge detection module 214 and the security pattern detection module 216 are shown as independent modules, however, it is understood that the modules 212, 214, and 216 or its sub-module 218 can be an integral component of the controller 208 and all the functionalities of the modules 212, 214, and 216 or its sub-module 218 can be performed by the controller 208 without departing from the scope. The components 202-218 are connected to each other via a conventional bus or a later-developed protocol. And, the components 202-218 communicate with each other for performing various functions of the present disclosure. The multi-function device 200 may further include additional component(s) as required to implement the present disclosure.

Figure 3A:
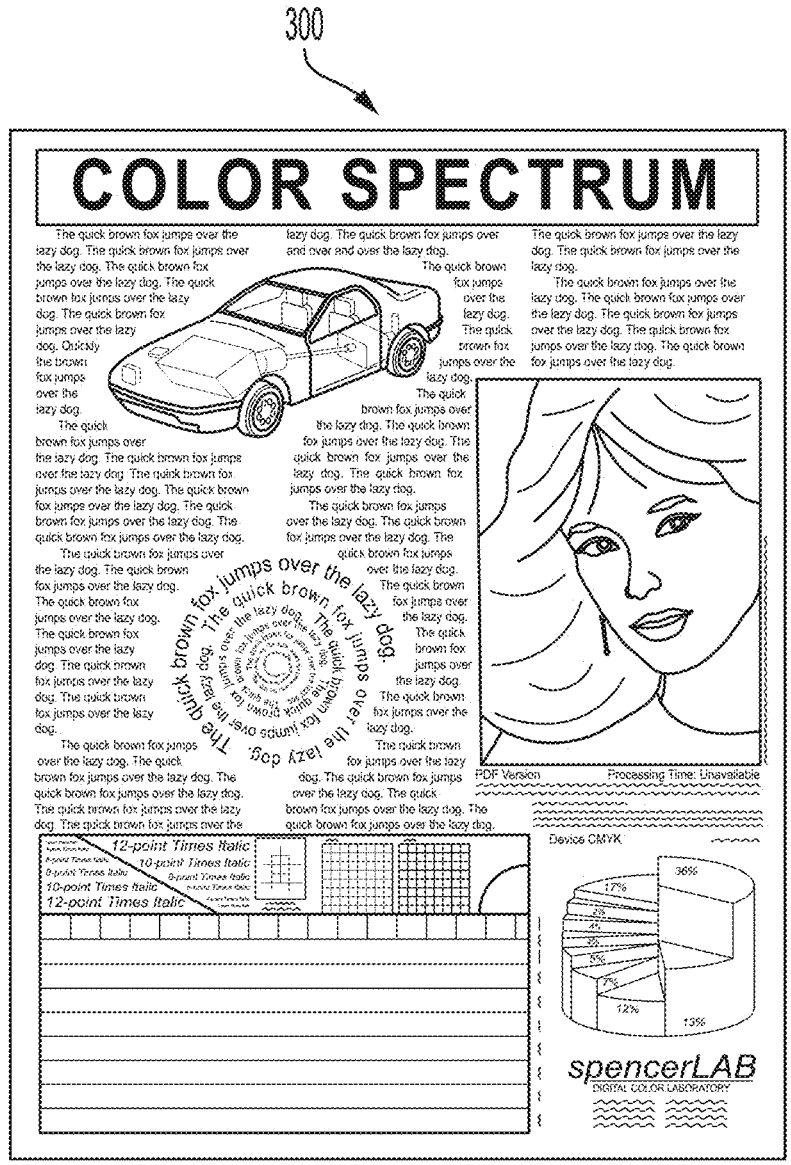
FIGS. 3A-3C illustrate exemplary snapshots of documents, in accordance with an embodiment of the present disclosure.

Initially, a user submits a document at the multi-function device 200. The document includes texts, images, infographics, etc. One such exemplary snapshot of a document 300 is shown in FIG. 3A. As illustrated, the document 300 includes content such as text, images, etc. The document is a physical document and the user submits the physical document directly at the multi-function device 200, specifically at the receiver 202 such as an automatic document handler or platen.

Post submitting the document, the user accesses the user interface 206. Once accessed, the user interface 206 displays multiple options such as scan, print, workflow, fax, and so on. In one example, the user interface 206 displays a new option, say "security pattern detection workflow" option. The option allows the user to detect the presence of the security patterns, specifically color dot patterns around text edges of the document. The user can select the option or by default, the multi-function device 200 enables the option. Once the options are displayed, the user selects a desired option and initiates scanning of the document. In one example, the user initiates scanning by selecting a scan option presented on the user interface 206.

Once selected, the controller 208 triggers the scanner 204 to scan the document. Once triggered, the scanner 204 scans the documents and generates scanned data. The scanned data generated refers to raw scanned images generated post-scanning without implementing any image processing techniques. Thereafter, the controller 208 sends the scanned data to the segmentation module 212 for further processing.

Once received, the segmentation module 212 extracts a textual portion, i.e., the portion including the textual content of the document. To accomplish this, the segmentation module 212 segments the received scanned data into one or more layers including an image layer and one or more text layers. The image layer includes the background and non-textual content, while the text layer includes the textual content. Thereafter, the text layers or content in the text layers are sent to edge detection module 214.

Figure 3B:

The edge detection module 214 performs one or more edge detection techniques on the text layers and identifies edges of the textual content. Thereafter, the edge detection module 214 generates a document/file including edges of texts/characters (textual content). One such exemplary snapshot of the document 302 including edges of the textual content detected by the edge detection module 214 is shown in FIG. 3B. Once generated, the document including the edges of the textual content is sent to the security pattern detection module 216 for further processing.

Once received, the security pattern detection module 216 detects the presence of the security patterns in the document based on information included in one or more templates. The templates include information related to portion information, edge filtering criteria and pattern information. The portion information includes information related to a particular portion of the document for checking the one or more security patterns, i.e., the portion of the document that includes the text or text edges that may include the security patterns. The information can be in the form of coordinates of the particular portion, say a top portion (e.g., between $1^{st}$ to $10^{th}$ line), a middle portion (e.g., between $10^{th}$ to $25^{th}$ line), or a lower portion (e.g., after 25th line) in the document. The edge filtering criteria include information related to various factors based on which the text edges included in the document (obtained after the edge detection) are filtered and one or more probable text edges that may include security patterns are identified. The edge filtering criteria include edge angle, edge size, edge intense, etc. The edge filtering criteria "edge angle" indicates an angle of the edge of a text/character (alphabet) that may include the security pattern. The value of the edge angle is represented in degrees. In one example, edge angle is the measure of an angle that the text edge (that may include the security pattern) makes with the horizontal. Exemplary values of the edge angle are 30 degrees, 45 degrees, 60 degrees, etc. The edge filtering criteria further include "edge size" which indicates the size of the text edge, specifically the size of a particular edge (text edge) that may include the security pattern, and is measured in terms of number of pixels. In one example, the edge size can be an area/dimension (length*width) of the edge (text edge). The value of the edge size can be a range, say <40 pixels, >40 pixels, >35 pixels and <55 pixels, and so on, or the value can be a specific value, say 30 pixels, 40 pixels, etc. Additionally, the edge filtering criteria include "edge intense" which indicates the thickness/width of the text edge, i.e., width/intense of the text edge that may include/accommodate the security pattern, and it is also measured in terms of number of pixels. Similar to edge size, the value of edge intense can be in the form of a range, e.g., <10 pixels, <9 pixels, etc., or the value can be a specific value, say 9 pixels, 10 pixels, etc. The pattern information includes information related to color of the security pattern or dot and the shape/pattern of the security dots. In one example, the color of the security dots can only be a primary color, i.e., the security dots can have only four possible colors, e.g., cyan, magenta, yellow, or black. Further, the color of the security dots may depend upon the color of the background (background of the text/character) or color of the text. For example, if the color of text is black, then the color of the dots can be magenta. The pattern information further includes information related to the shape/pattern of the color dots. In one example, the shape can be a line.

Further, the values/data corresponding to various information (i.e., portion information, edge filtering criteria and pattern information) associated with a template can be pre-stored in memory 210 of the multi-function device 200 or can be provided/input by the user. In one example, the memory 210 maintains a repository of one or more templates and each template includes pre-defined values corresponding to each information, i.e., a pre-defined value/information corresponding to the portion information, edge filtering criteria and pattern information. These values/information can be pre-defined by a user such as an admin user. In another example, the user can provide/input the information via the user interface 206 while submitting the document. To accomplish this, the user interface 206 may display individual options to allow the user to separately provide/input information related to the portion information, edge filtering criteria and pattern information. Alternatively, the user interface 206 may display one or more templates pre-stored in the memory 210 for user selection. Once different templates are displayed, the user can select a desired template. Thereafter, the user-selected template information is stored in the memory 210 for later retrieval/use. For easy understanding, the disclosure is discussed with respect to a scenario where the user provides/inputs values for the information either by selecting the template or by inputting the values while submitting the document. Therefore, the security pattern detection module 216 obtains the user input template information, i.e., the template information input/selected by the user.

Once obtained, the security pattern detection module 216, first identifies a portion of the document (obtained after the edge detection) based on portion information included in the user-selected template information and extracts the identified portion. For instance, if the portion information includes coordinates of a specific portion, say the middle portion, then the security pattern detection module 216 only extracts the specific segment/portion of the document. For easy understanding, the disclosure is discussed with respect to a scenario where a specific portion of the document is extracted, however, the disclosure can be implemented for a scenario where the portion information includes the complete document, instead of any particular portion.

Once extracted, the security pattern detection module 216, specifically the edge filtering module 218 processes the extracted portion based on the edge filtering criteria included in the user-selected template information and identifies the one or more text edges for detecting the security patterns. To accomplish this, the edge filtering module 218, first, filters the text edges (included in the extracted portion) based on the edge filtering criteria "edge angle". Then, the filtered text edges are further filtered based on the edge filtering criteria "edge size". Once further filtered, the filtered edges (i.e., edges obtained after the "edge size" based filtering) are yet again filtered based on the edge filtering criteria "edge intense".

Figure 3C:

In detail, the edge filtering module 218, first filters the text edges based on the edge filtering criteria "edge angle". Here, the edge filtering module 218 compares the edge angle value included in the user-selected template information with the angle of text edges present in the extracted portion. Upon comparison, the edge filtering module 218 identifies the text edges matching the edge angle value included in the user-selected template information. For instance, if the value of the edge angle included in the user-selected template information is 30 degrees, then all the text edges with an angle of 30 degrees are considered for further processing, and the remaining text edges are discarded/not considered for further processing. FIG. 3C illustrates one such exemplary snapshot of a document 304. Here, it is considered that the user input value of the edge angle is 45 degrees. When, the edge filtering module 218 filters the text edges of the document 302 of FIG. 3B based on the edge filtering criteria "edge angle", the document 304 is generated. The document 304 only includes the text edges that match the angle value included in the user-selected template information, i.e., 45 degrees.

This way, the edge filtering module 218 identifies all text edges matching input edge angle. Once all the text edges matching edge angle criteria are identified, the edge filtering module 218 filters the identified texts/text edges based on the edge filtering criteria "edge size". Here, the size (i.e., size/dimension/area) of the identified text edges (i.e., edges identified after the angle comparison) is compared with the edge size input by the user or the edge size included in the user-selected template, and accordingly, the text edges are filtered. For instance, if the user input value of edge size is ">40 pixels", then all the text edges are considered for further processing for which the edge size is greater than 40 pixels, and all the remaining text edges are discarded/not considered.

This way, the edge filtering module 218 identifies all text edges matching the input edge angle and the input edge size. Once the text edges matching edge size criteria are identified, the edge filtering module 218 further filters identified text edges (i.e., edges identified after the edge angle and the edge size comparison) based on the edge filtering criteria "edge intense". Here, the intense or width/thickness of the text edges is compared with the intense value input by the user or the edge intense value included in the user-selected template, and accordingly, the text edges are filtered. For instance, if the user input value of edge intense is ">10 pixels", then all the text edges are considered for further processing for which the edge intense is greater than 10 pixels and all the remaining text edges are discarded/not considered for further processing. This way, edge filtering module 218 identifies all the text edges matching the edge filtering criteria, i.e., edge angle, edge size and edge intense value included in the user input template information, and the text edges matching these criteria are considered for further analysis.

Once the text edges matching the edge filtering criteria are identified, the security pattern detection module 216 identifies the shape of the identified text edges and the color of the identified text edges, i.e., color of the pixels constituting the text edges. The shape of the text edges and the color of the text edges are identified using any known or later-developed methods. In one example, the shape of the text edges is identified using morphological operations. In another example, the color of the text edges is detected using color segmentation operation. Once the shape and color of the text edges are identified, the security pattern detection module 216 compares the identified shape with the shape information input by the user (i.e., information included in the user input template information) and the color of the text edges with the color information input by the user. Based on the comparison, the security pattern detection module 216 detects the presence of color dots around text edges which further helps to identify security patterns in the document. This way, the security pattern detection module 216 detects the presence of the security pattern in the document based on the user-selected/input template information.

Although, the disclosure is explained with respect to a scenario where the user selects/inputs the template information while submitting the document. However, the disclosure can be implemented in a scenario where the user does not input the template information. In such scenario, the security pattern is detected based on one or more templates pre-stored in the memory 210 of the multi-function device 200. All the pre-stored templates are used one by one for text edge analysis. In detail, first, a portion of the document is extracted based on the portion information of one template, say $1^{st}$ template. Then, the text edges are identified/filtered from the extracted portion based on the edge filtering criteria included in the template, i.e., $1^{st}$ template. Thereafter, the pattern of the filtered edges is compared with the pattern included in the template, i.e., $1^{st}$ template. If the pattern matches, the document is identified as confidential, else, the text edges of the document are analyzed based on a subsequent template, i.e., $2^{nd}$ template. Thus, the text edges are analyzed based on all the pre-stored templates, and if the text edges satisfy any of the pre-stored templates, then the document is classified as confidential, else the document is classified as non-confidential.

This way, the security pattern detection module 216 detects the security pattern and thus detects whether the document is genuine/original/authentic/confidential document. Based on the detection, the security pattern detection module 216 performs a desired action. In one example, the security pattern detection module 216 displays a notification on the user interface 206 to notify the user whether the document is genuine or not. In another example, if the document is identified as confidential, the security pattern detection module 216 may trigger a notification for an admin user. In yet another example, if the document is identified as confidential, the security pattern detection module 216 aborts the processing of the job and notifies the user.

Continuing with FIG. 2 description, although the user interface 206 as shown in FIG. 2 is a part of the multi-function device 200, but the user interface 206 can be an external display or device that can be connected to the multi-function device 200. Further, the user interface 206 displays various options and/or information to the user for implementing the present disclosure. For example, the user interface 206 displays various options such as "security pattern detection workflow", notification regarding confidentiality of the submitted document, or other options. In a further example, the user interface 206 may be used to receive input such as edge filtering criteria, portion/location information, pattern information, scan/copy attributes, or the like.

The memory 210 stores all relevant information required for implementing the current disclosure. For example, the memory 210 temporarily stores the document, scanned data, scan attributes or other information relevant for implementing the present disclosure. In context of the current disclosure, the memory 210 stores multiple pre-defined templates and information included in the templates, i.e., edge filtering criteria, portion/location information, pattern information, etc. Further, the memory 210 may store the template information selected/input by the user. Any details stored in the memory 210 may be retrieved by the security pattern detection module 216, the controller 208 or other components for implementing the current disclosure.

Exemplary Snapshots

Figure 4A:
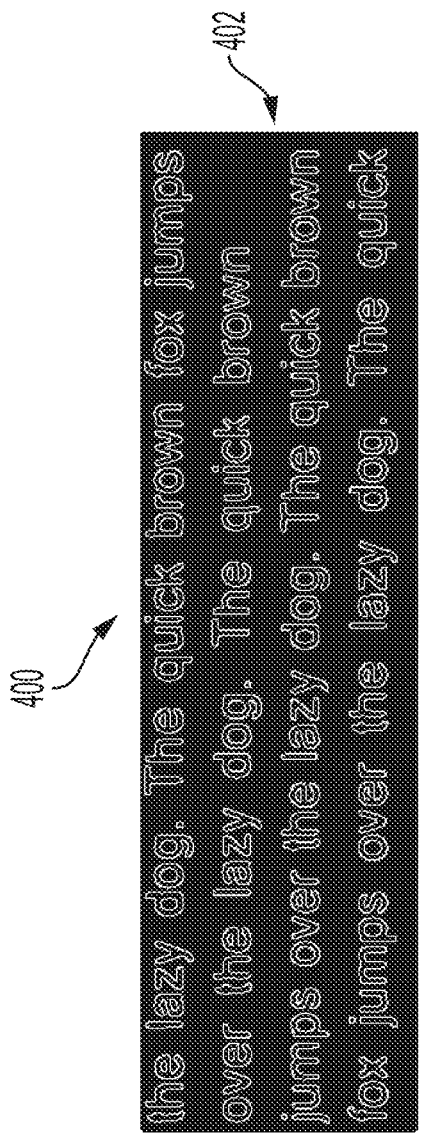
FIGS. 4A-4D illustrate exemplary snapshots, in accordance with an embodiment of the present disclosure.
Figure 4B:
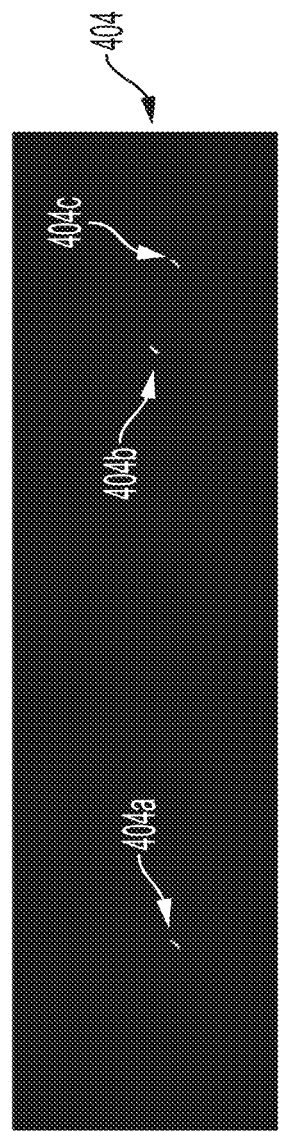
Figure 4C:
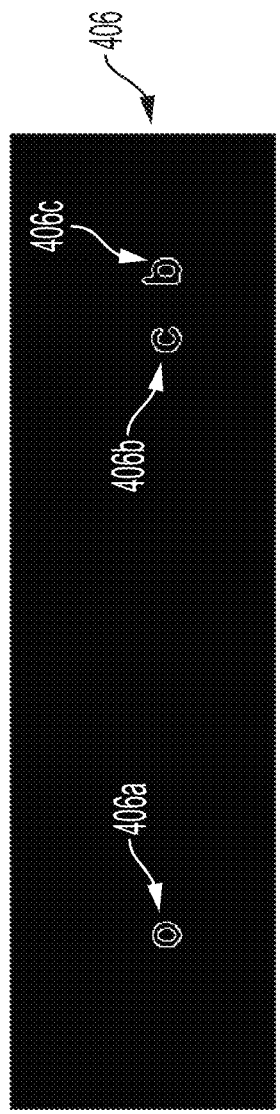
Figure 4D:
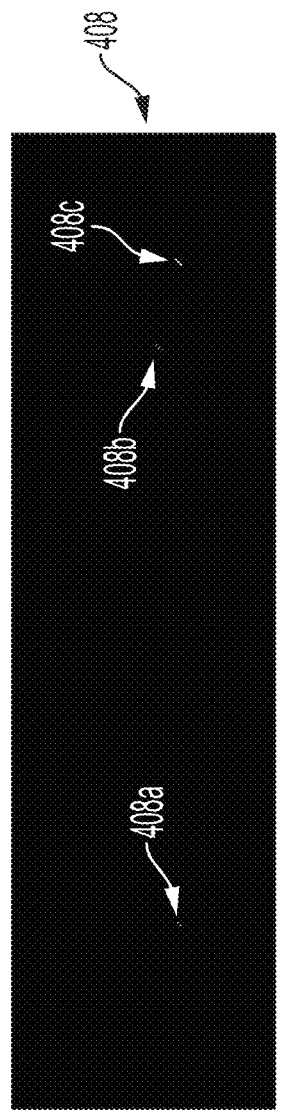

FIG. 4A illustrates an exemplary snapshot 400 of a portion 402 extracted from a document 302, where edges of content are defined/detected, as discussed in FIG. 3B. The portion is extracted based on the portion information included within the template information. According to the implementation, when edge filtering criteria are applied, text edges matching input edge angle, edge size and edge intense value included in the template are identified. As an example, text edges (labeled as 404a, 404b, 404c) identified based on the edge filtering criteria are shown in snapshot 404 of FIG. 4B. Textual content 406a, 406b and 406c corresponding to the identified text edges 404a, 404b and 404c, respectively are shown in the snapshot 406 of FIG. 4C. Once the text edges are identified, the shape and the color of the identified text edges are identified first. As an example, color and shape of the text edges labeled as 408a, 408b, and 408c corresponding to the identified text edges 404*a*, 404*b* and 404*c*, respectively are shown in the snapshot 408 of FIG. 4D. The color and shape of the identified text edges are matched with the pattern information included in the template information to detect whether the document is genuine/original/authentic/confidential document.

Exemplary Flowchart

Figure 5:
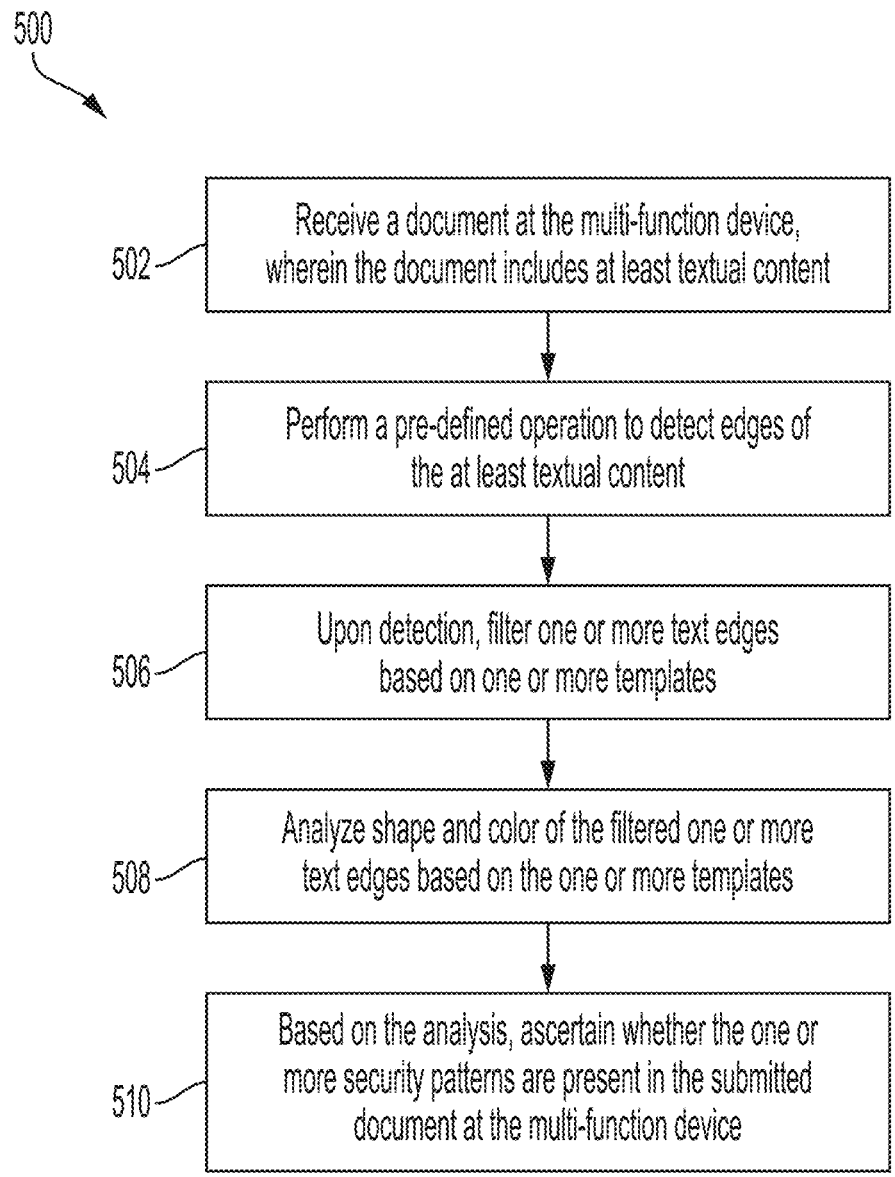
FIG. 5 illustrates a method flowchart for detecting one or more security patterns in documents submitted at a multi-function device.

FIG. 5 is a method 500 for detecting one more security patterns in text edges of documents. The method 500 may be implemented at a multi-function device, such as the multi-function device 102 of FIG. 1, the multi-function device 200 of FIG. 2. However, the method 500 can be implemented at any equivalent device with functionalities such as printing, scanning, and so on.

The method 500 begins when a user submits a document at the multi-function device. Once submitted, at 502, the document is received and the document at least includes textual content. In one example, the document may include texts, images, infographics, etc. The document is a physical document and the document is submitted for scanning. After submitting the document, the user initiates the further processing, say by selecting the scan option. Thereafter, the document is scanned and scanned data/digital data is generated. Once generated, the scanned data is segmented into one or more layers such as an image layer and one or more text layers. The image layer includes the background and non-textual content, while the text layer includes the textual content.

Once segmented, at 504, a pre-defined operation is performed on the text layer including the textual content to detect the edges of the textual content. Any known or later developed edge detection techniques are applied to the text layer to detect edges of the textual content. Once edge detection is performed, a document/file including edges of texts/characters is generated.

Upon detection, at 506, the one or more text edges are filtered based on one or more templates. In detail, templates include information related to portion information, edge filtering criteria and pattern information. The portion information includes information related to a particular portion of the document for checking the one or more security patterns, i.e., the portion of the document that includes the text or text edges that may include security patterns. The edge filtering criteria include information related to various factors based on which the text edges included in the document (obtained after the edge detection) are filtered and one or more probable text edges that may include security patterns are identified. The edge filtering criteria include edge angle, edge size, edge intense or width/thickness of the text edge, etc. The pattern information includes information related to color of the security pattern or dot and shape/pattern of the security dots. Further, the values/data corresponding to various information (i.e., portion information, edge filtering criteria and pattern information) associated with a template can be pre-stored in the multi-function device or can be provided/input by the user. In one example, the multi-function device maintains a repository of one or more templates and each template includes pre-defined values corresponding to each information, i.e., a pre-defined value/information corresponding to the portion information, edge filtering criteria and pattern information. These values/information can be pre-defined by a user such as an admin user. In another example, the user can provide/input the information while submitting the document. Here, the user provides the template information. Therefore, the user input template information is used to filter the one more text edges.

Here, first, a portion of the document (obtained after the edge detection) is identified based on portion information included in the user input template information and extracted. Once extracted, the extracted portion is processed based on the edge filtering criteria included in the user input template information and the one or more text edges are identified for detecting the security patterns. To accomplish this, first, the text edges (included in the extracted portion) are filtered based on the edge filtering criteria "edge angle". Then, the filtered text edges are further filtered based on the edge filtering criteria "edge size". Once further filtered, the filtered edges (i.e., edges obtained after the "edge size" based filtering) are again filtered based on the edge filtering criteria "edge intense". This way, the text edges matching the edge filtering criteria, i.e., edge angle, edge size and edge intense value included in the user input template information are identified and filtered.

Once filtered, at 508, shape and color of the filtered one or more text edges are analyzed based on the one or more templates. To accomplish this, the shape of the filtered text edges and the color of the filtered text edges, i.e., color of the pixels constituting the text edges are identified. The shape of the text edges and the color of the text edges are identified using any known or later-developed methods. In one example, the shape of the text edges is identified using morphological operations. In another example, the color of the text edges is detected using a color segmentation operation. Once the shape and color of the text edges are identified, the identified shape is compared with the shape information input by the user (i.e., information included in the user input template information) and the color of the text edges is compared with the color information input by the user.

Based on the comparison or analysis, at 510, presence of the one or more security patterns is ascertained in the submitted document at the multi-function device. If both the color and shape of the filtered text edges match with the color and shape, respectively input by the user, then it is ascertained that the security pattern is present, else the security pattern is not present. Further, based on the presence of the security pattern, genuineness/originality/authenticity/confidentiality of the document is detected. Based on the detection, a desired action is performed. In one example, if the document is identified as confidential (i.e., a security pattern is detected in the document), then the job request (i.e., scan job, copy job, etc.) of the user is not processed. In another example, if the document is identified as confidential, a notification is sent to an admin user. This way, the security patterns are detected around text edges of the document.

The present disclosure discloses methods and systems for detecting security patterns, i.e., color dot patterns in the text edges. Specifically, the methods and systems detect the security pattern around edges of one or more texts of the confidential document which are not visible through the naked eye. Thus, the methods and systems assist in ensuring better security, as the security patterns are not visible and thus its duplication becomes difficult. Further, according to the disclosure, the methods and systems allow defining/customization of the unique template, angle, range and intense based on customer requirements. Thus, the methods and systems add value to existing solutions. The methods and systems allow the user to specify a particular portion of the document for pattern detection. Thus, the system offers a less complex solution for the problem and it is less computation-intensive. The methods and systems allow users, say admin users to define templates of the security pattern information, thus the methods and systems offer a better solution. Further, the secure stamps would be retained/transferred between digital and print media. Additionally, the user experience is enhanced.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacturer or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, extracting, adding, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting one or more security patterns in a document submitted at a multi-function device, the method comprising:
    receiving the document at the multi-function device, wherein the document comprises at least textual content;
    performing a pre-defined operation to detect edges of the at least textual content;
    upon detection, filtering, one or more text edges based on one or more templates;
    further analyzing, based on the one or more templates, shape and color of the filtered one or more text edges; and
    based on the analysis, ascertaining whether the one or more security patterns are present in the submitted document at the multi-function device.

2. The method of claim 1, wherein information associated with the one or more templates is input by a user submitting the document.

3. The method of claim 1, wherein the one or more templates are pre-stored.

4. The method of claim 1, wherein the one more templates comprise at least one of: portion information, edge filtering criteria, and pattern information.

5. The method of claim 4, wherein the portion information comprises at least one of: information related to a portion of the document for checking the one or more security patterns and/or coordinates of the portion of the document.

6. The method of claim 4, wherein the edge filtering criteria comprises at least one of: edge angle, edge size, and edge intense.

7. The method of claim 4, wherein the pattern information comprises at least one of: shape of one or more security patterns and color of the one or more security patterns.

8. The method of claim 1, further comprising, identifying and extracting a portion of the document comprising the at least textual content for checking presence of the one or more security patterns in the document.

9. The method of claim 1, further comprising, disallowing a user to reproduce one or more copies of the document.

10. The method of claim 1, wherein the filtering one or more text edges comprises:
    identifying the one or more text edges matching edge filtering criteria included in the one or more templates.

11. The method of claim 1, wherein the analyzing shape and color of the one or more filtered edges comprises:
    comparing the shape of the one or more filtered text edges with a shape included in the one or more templates; and
    comparing the color of the one or more filtered text edges with a color included in the one or more templates.

12. The method of claim 1 is implemented in form of a non-transitory computer-readable medium.

13. A multi-function device for detecting one or more security patterns in a document submitted at a multi-function device, the multi-function device comprising:
    a receiver for receiving the document at the multi-function device, wherein the document comprises at least textual content;
    an edge detection module for detecting edges of the at least textual content;
    a security pattern detection module for:
        upon detection, filtering one or more text edges based on one or more templates;
        further analyzing, based on the one or more templates, shape and color of the filtered one or more text edges; and
        based on the analysis, ascertaining whether the one or more security patterns are present in the submitted document at the multi-function device.

14. The multi-function device of claim 13, wherein the one or more templates comprise at least one of: portion information, edge filtering criteria, and pattern information.

15. The multi-function device of claim 14, wherein the portion information comprises at least one of: information related to a portion of the document for checking the one or more security patterns and/or coordinates of the portion of the document.

16. The multi-function device of claim 14, wherein the edge filtering criteria comprises at least one of: edge angle, edge size, and edge intense.

17. The multi-function device of claim 14, wherein the pattern information comprises at least one of: shape of one or more security patterns and color of the one or more security patterns.

18. The multi-function device of claim 13, further comprising, a memory for storing the one or more templates at the multi-function device.

19. The multi-function device of claim 13, further comprising, a user interface for allowing the user to input information associated with the one or more templates.

20. The multi-function device of claim 13, further comprising a segmentation module for identifying and extracting a portion of the document comprising the at least textual content for checking presence of the one or more security patterns in the document.

21. The multi-function device of claim 13, wherein the security pattern detection module is for disallowing a user to reproduce one or more copies of the document.

22. The multi-function device of claim 13, wherein the security pattern detection module filtering the one or more text edges comprises:
    identifying one or more text edges matching edge filtering criteria included in the one or more templates.

23. The multi-function device of claim 13, wherein the security pattern detection module analyzing the shape and color of the one or more filtered edges comprises:
    comparing the shape of the one or more filtered text edges with a shape included in the one or more templates; and
    comparing the color of the one or more filtered text edges with a color included in the one or more templates.

* * * * *